(12) United States Patent
Bui et al.

(10) Patent No.: US 7,570,016 B2
(45) Date of Patent: Aug. 4, 2009

(54) BATTERY PACK INCLUDING MULTIPLE BATTERY CELL TECHNOLOGIES

(75) Inventors: Vinh X. Bui, Round Rock, TX (US); Dan Kehoe, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 11/970,746

(22) Filed: Jan. 8, 2008

(65) Prior Publication Data

US 2008/0102352 A1 May 1, 2008

Related U.S. Application Data

(62) Division of application No. 10/836,505, filed on Apr. 30, 2004, now Pat. No. 7,339,348.

(51) Int. Cl.
*H01M 10/46* (2006.01)
(52) U.S. Cl. ....................................................... 320/106
(58) Field of Classification Search ................... 702/63; 320/106, 110, 119, 125; 713/300, 321
See application file for complete search history.

(56) References Cited

U.S. PATENT DOCUMENTS

| | | | |
|---|---|---|---|
| 5,218,286 | A | 6/1993 | VanDunk |
| 5,541,489 | A | 7/1996 | Dunstan |
| 5,606,242 | A | 2/1997 | Hull et al. |
| 5,646,501 | A | 7/1997 | Fishman et al. |
| 5,714,870 | A | 2/1998 | Dunstan |
| 5,780,992 | A | 7/1998 | Beard |
| 5,903,764 | A | 5/1999 | Shyr et al. |
| 6,784,641 | B2 | 8/2004 | Sakai et al. |
| 6,892,147 | B2 | 5/2005 | Bui et al. |
| 7,339,348 | B2 * | 3/2008 | Bui et al. ................. 320/106 |

OTHER PUBLICATIONS

"Maxim Cost Saving Multichemistry Battery Charger System", Sep. 1996, pp. 1-12, http://pdfserv.maxim-i.com/en/ds/MAX846A.pdf.

* cited by examiner

*Primary Examiner*—Edward Tso
(74) *Attorney, Agent, or Firm*—Haynes and Boone, LLP

(57) ABSTRACT

A battery pack includes a housing. A first battery is located in the housing, the first battery using a first cell technology. A second battery is located in the housing, the second battery using a second cell technology that is different from the first cell technology. The battery pack can be connected to a portable computer chassis to provide an extended life power source.

7 Claims, 5 Drawing Sheets

BATTERY PACK INCLUDING MULTIPLE BATTERY CELL TECHNOLOGIES

CROSS-REFERENCE TO RELATED APPLICATION

This application claims priority to and is a divisional of co-owned, co-pending U.S. patent application Ser. No. 10/836,505, filed Apr. 30, 2004, which is incorporated herein by reference in its entirety.

BACKGROUND

The present disclosure relates generally to information handling systems, and more particularly to a battery pack for an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In order to increase portability, information handling systems may rely on batteries to provide their power. Battery packs are used to house batteries and provide easy connection of the batteries to the information handling system. It is desirable for the information handling system to operate on the battery power for as long as possible, which may require larger battery packs that hold more batteries. This is in conflict with the desire to reduce the size of the information handling system as much as possible to further increase portability.

One solution to this problem is to provide multiple battery packs for the information handling system. This allows a user to choose between a standard battery pack which provides power to the information handling system over a given period of time, and an extended life battery pack which provides power to the information handling system over a longer period of time than the standard battery pack but takes up more space than the standard battery pack.

Extended life battery packs may use different battery cell technologies than the standard battery packs, the result being that an extended battery pack battery will have a different chemistry, different shape, different capacity, and generally different properties than the standard battery pack battery. The extended life battery packs may be larger in size than the standard battery packs, and may not fit in the battery port in the information handling system chassis which is designed for the standard battery pack. However, it is desirable for the extended battery pack to use the same battery connection on the information handling system that the standard battery pack uses. Typically a connector is extended from the extended life battery and through the battery port to the battery connection on the information handling system. The result is that the portion of the extended life battery pack containing the battery may be situated external to the information handling system chassis when it is connected to the battery connection.

Situating the extended life battery pack partially external to the information handling system, then extending the battery connector through the battery port to the battery connection on the information handling system in order to connect the extended life battery, results in wasted volume in the unused portion of the battery port.

Accordingly, it would be desirable to provide a battery pack for an information handling system absent the disadvantages found in the prior systems and methods discussed above.

SUMMARY

According to one embodiment, a battery pack includes a housing. A first battery is located in the housing, the first battery using a first cell technology. A second battery is located in the housing, the second battery using a second cell technology that is different from the first cell technology.

A principal advantage of this embodiment is that two batteries with different cell technologies may be used in the same battery pack. This allows different type and sized batteries to be implemented in a battery pack to optimize the use of available volume in an information handling system.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
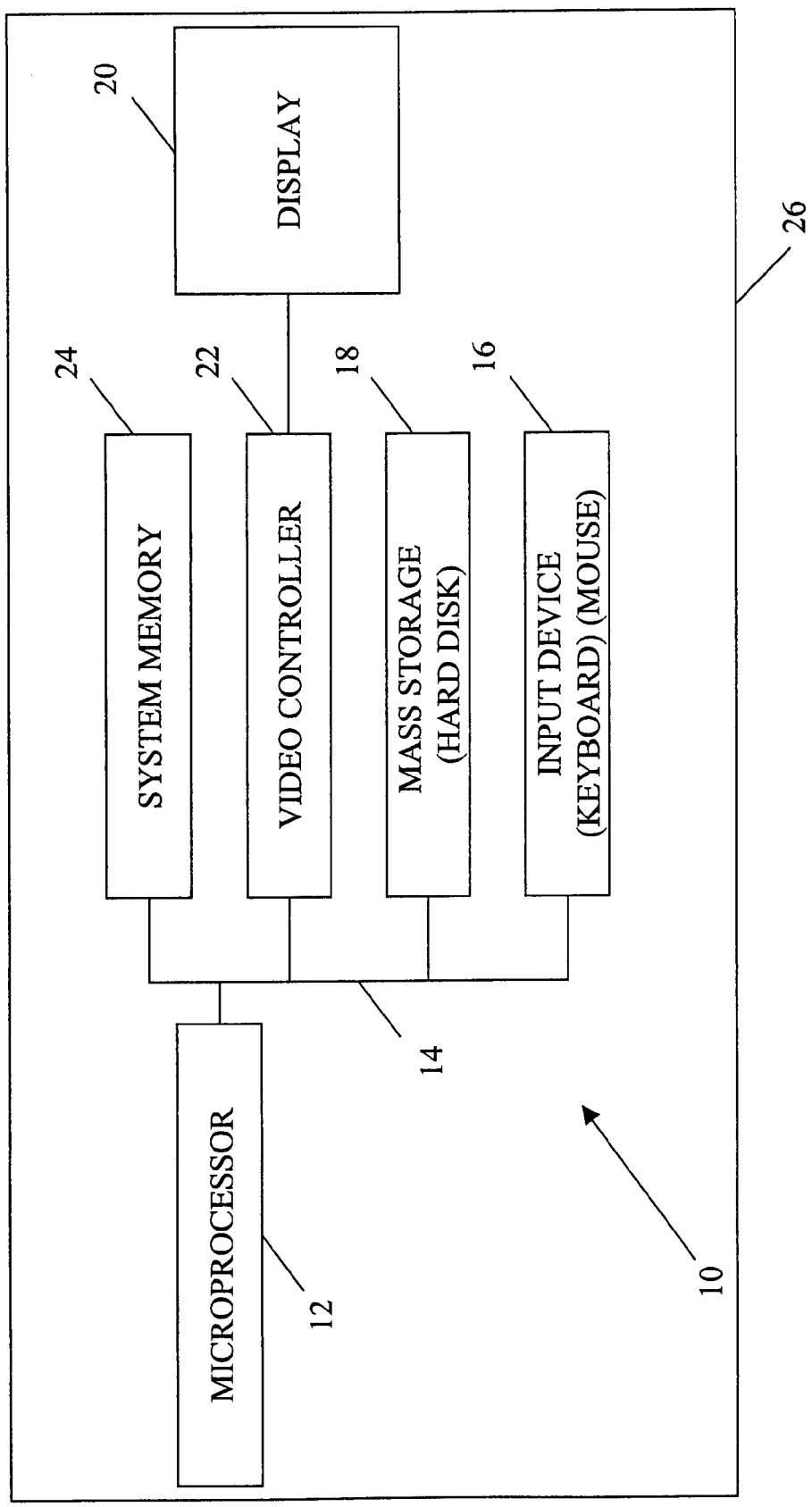
FIG. 1 is a schematic view illustrating an embodiment of an information handling system.

In an embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
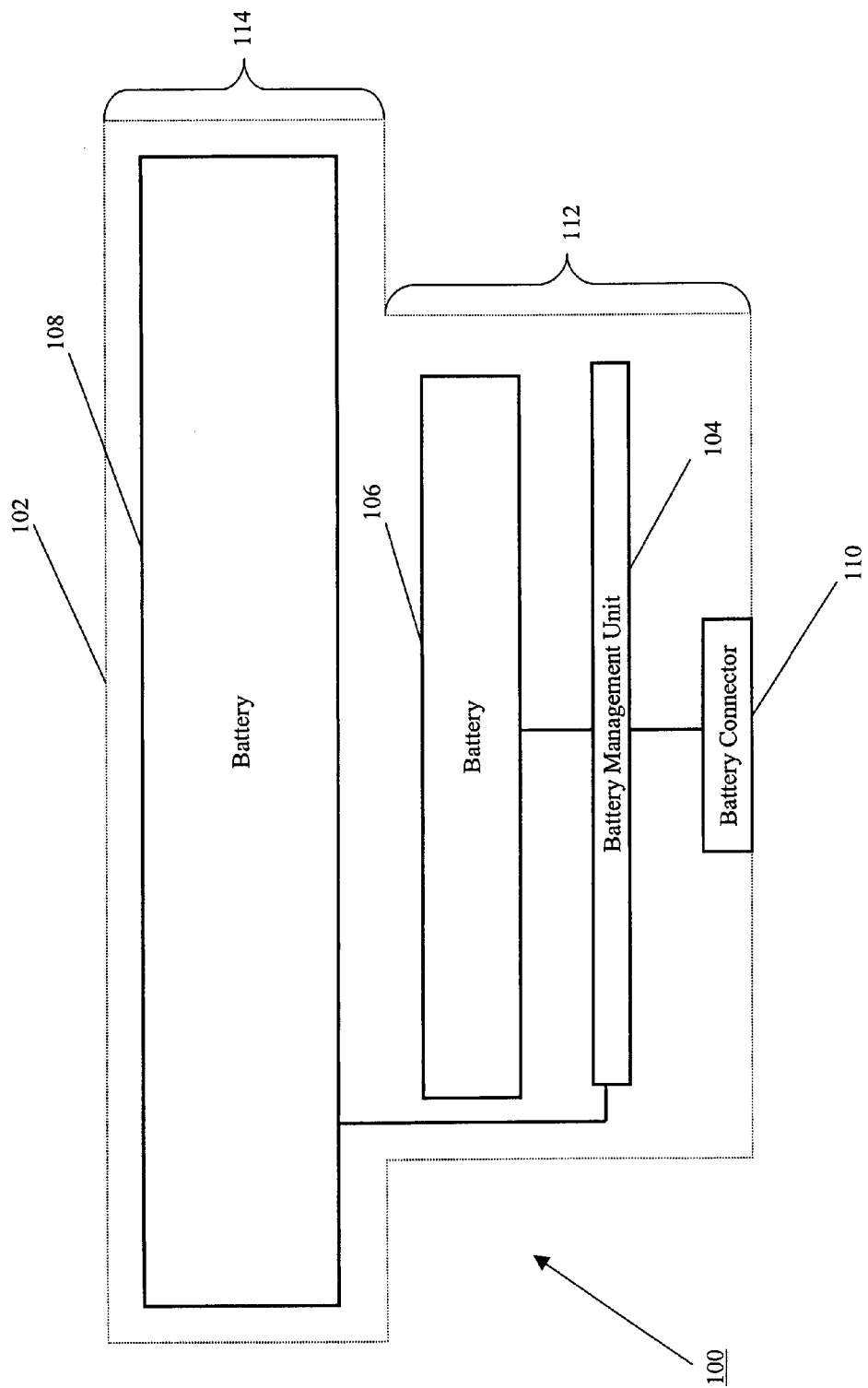
FIG. 2 is a schematic view illustrating an embodiment of a battery pack.

A battery pack 100, FIG. 2, includes a housing 102. Housing 102 houses a number of components, including a battery management unit 104, a battery 106 coupled to the unit 104, and a battery 108 coupled to the unit 104. Battery management unit 104 is a local controller that may monitor and control cell temperature, charge cycle, charge level, and other operating parameters of the batteries. Battery 106 and 108 use conventional cell technologies such as prismatic, cylindrical, polymer, or nickel metal hydride, with battery 108 using a cell technology that is different from the cell technology used by battery 106. Battery 108 may be larger than battery 106 depending on the power requirements of the system. A battery connector 110 is included on the battery pack 100, the connector 110 being coupled to the unit 104. The battery pack 100 may include a section 112 housing battery 106, and a section 114 housing battery 108 which may be larger than section 112 due to the size of the battery 108 needed to satisfy the power requirements of the system. The battery connector 110 may be housed in the housing 102 or may be totally or partially external to the housing 102, and provides a connection for connecting the battery pack 100 to an information handling system such as the information handling system 10 of FIG. 1.

Within the scope of the embodiments described herein, battery technology used in batteries 106 or 108 may be conventional commercially available prismatic batteries such as, for example, Sanyo 125280 cells; conventional commercially available cylindrical batteries such as, for example, Sony 18650 cells; conventional commercially available polymer batteries such as, for example, Sanyo 5540100 cells; or conventional commercially available nickel metal hydride batteries such as, for example, Eveready Energizer NiMH AA cells.

Figure 3:
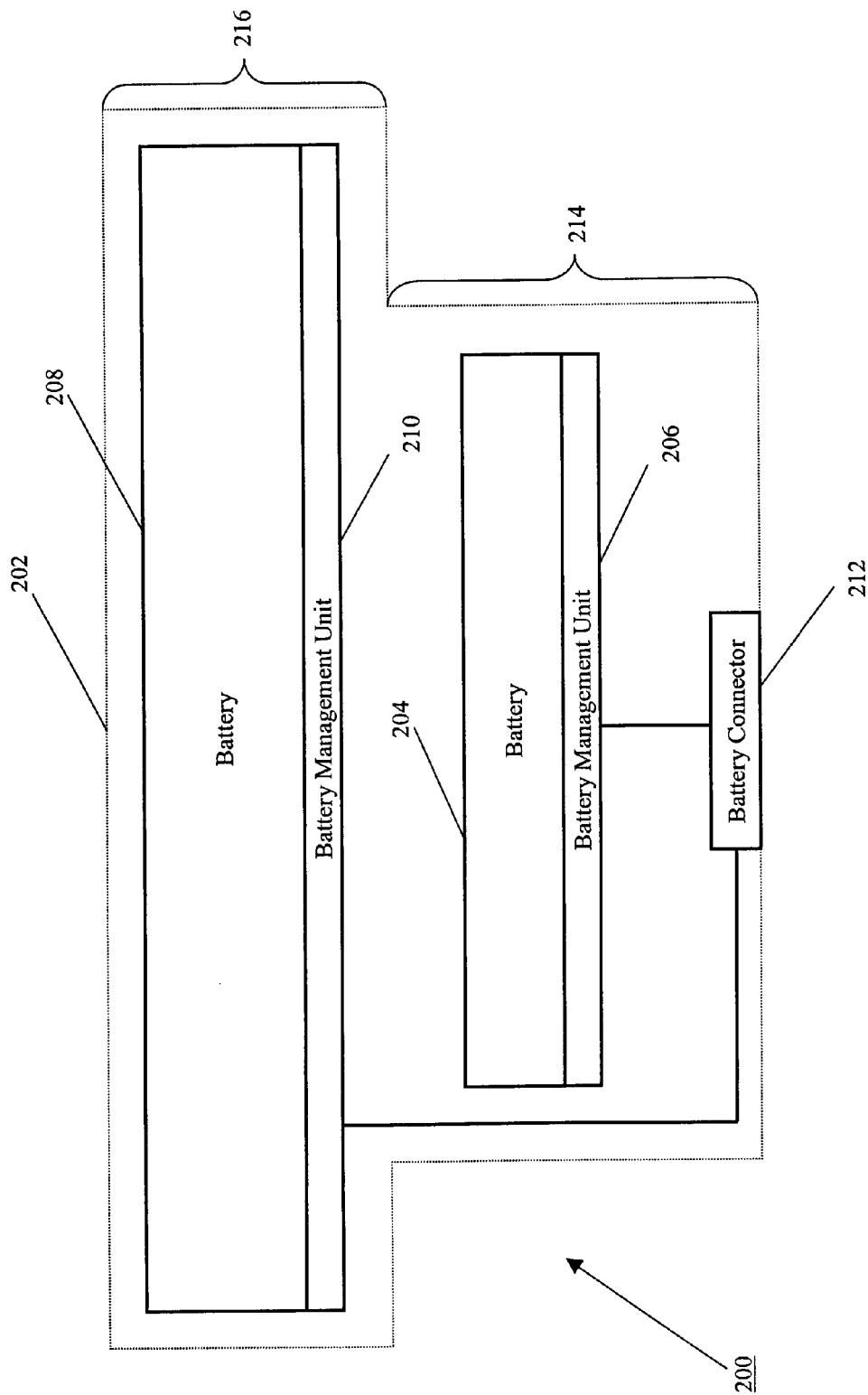
FIG. 3 is a schematic view illustrating an embodiment of a battery pack.

In an embodiment, a battery pack 200, FIG. 3, includes a housing 202. Housing 202 houses a number of components, including a battery 204 coupled to a battery management unit 206, and a battery 208 coupled to a battery management unit 210. Battery management units 206 and 210 are local controllers that may monitor and control cell temperature, charge cycle, charge level, and other operating parameters of the batteries. Batteries 204 and 208 use conventional cell technologies such as prismatic, cylindrical, polymer, or nickel metal hydride, with battery 204 using a cell technology that is different from the cell technology used by battery 208. Battery 208 may be larger than battery 204 depending on the power requirements of the system. A battery connector 212 is included on the battery pack 200, the connector 212 being coupled to the battery management units 206 and 210. The battery pack 200 may include a section 214 housing battery 204, and a section 216 housing battery 208 which is larger than section 214 due to the size of battery 208 needed to satisfy the power requirements of the system. The battery connector 212 may be housed in the housing 202 or may be totally or partially external to the housing 202, and provides a connection for connecting the battery pack 200 to an information handling system such as the information handling system 10 of FIG. 1. While one battery management unit may be used to manage multiple batteries using different cell technologies in the battery pack, such as in FIG. 2, dedicating a battery management unit to each battery using different cell technologies provides a simpler battery management unit design.

Within the scope of further embodiments described herein, battery technology used in batteries 204 or 208 may be similar to the battery technology described above with reference to batteries 106 and 108.

Figure 4:
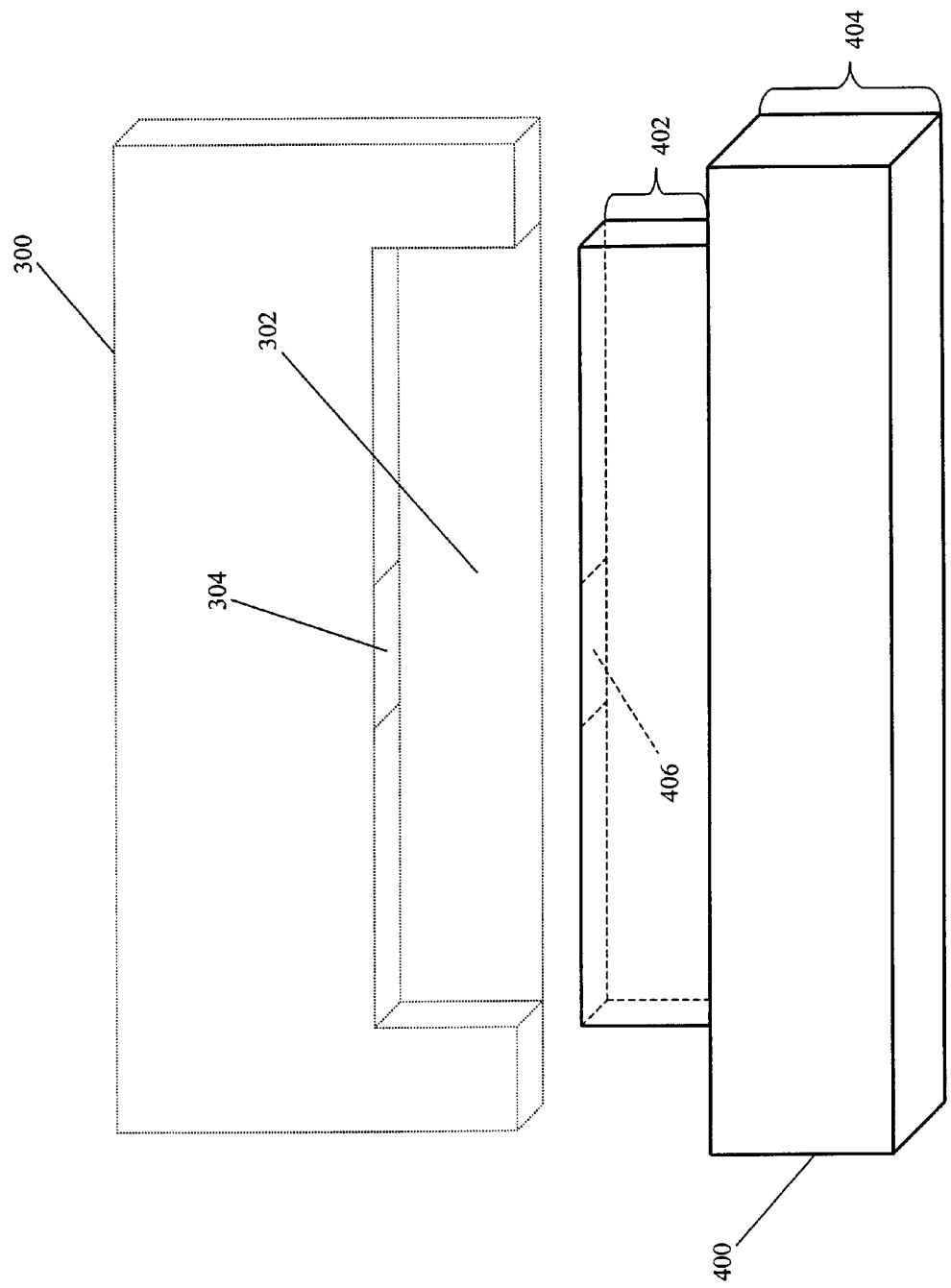
FIG. 4 is a perspective view illustrating an embodiment of an information handling system and a battery pack.
Figure 5:
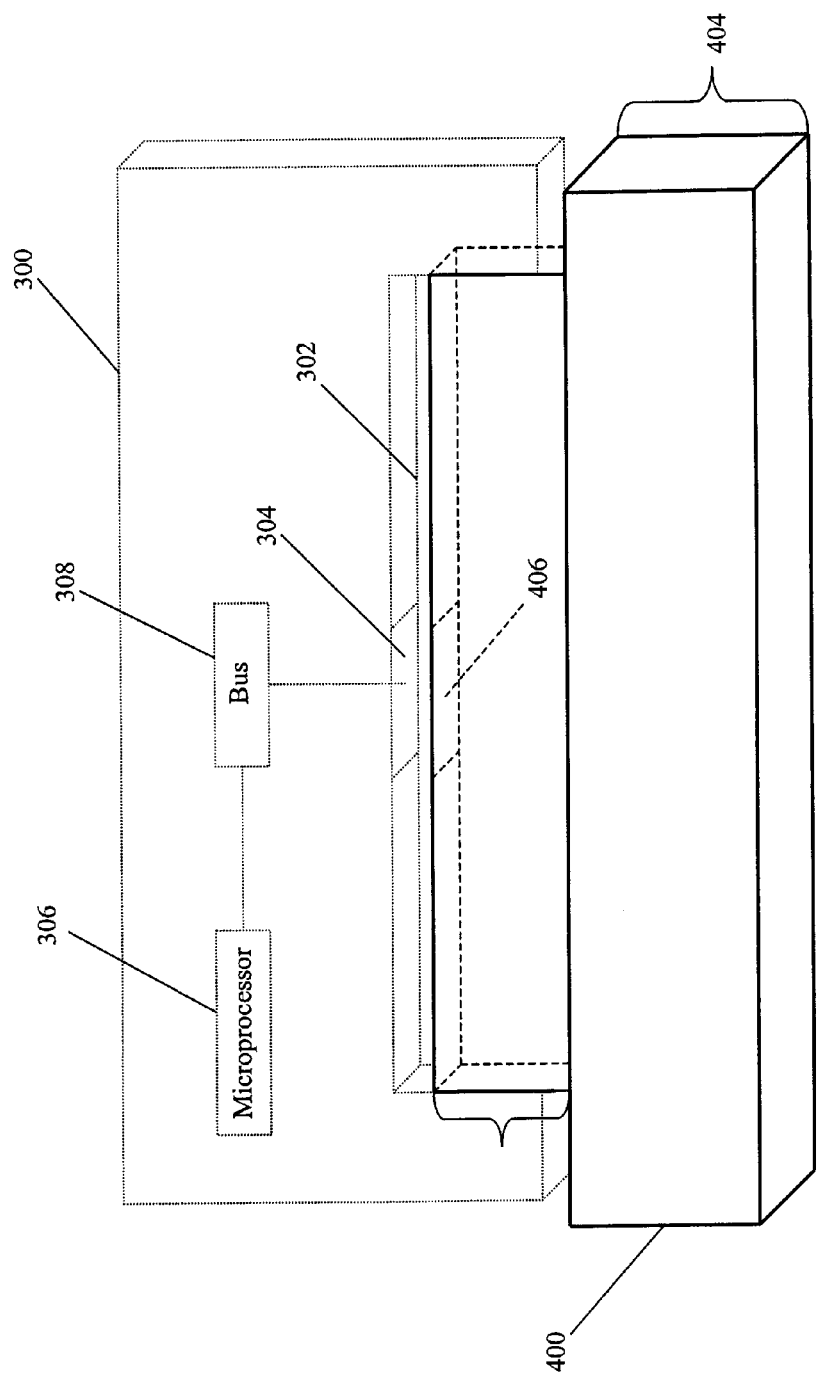
FIG. 5 is a perspective view illustrating an embodiment of an information handling system connecting to a battery pack.

In operation, FIGS. 4 and 5, an information handling system 300, which may be the information handling system 10 of FIG. 1, includes a battery port 302 with a system connector 304. A battery pack 400, which may be the battery pack 100 of FIG. 1 or the battery pack 200 of FIG. 2, includes a section 402 with a pack connector 406 on it's surface, and a section 404 adjacent to the section 402. Connection of battery pack 400 to information handling system 300 is accomplished by placing section 402 of battery pack 400 in battery port 302, such that pack connector 406 engages system connector 304. With pack connector 406 engaged with system connector 304, battery pack 400 is coupled to microprocessor 306 in information handling system 300 through a bus 308 such as a system management bus. The bus 308 controls the operation of the batteries by communicating with the battery management units, shown in FIGS. 2 and 3, connected to the batteries in the battery pack. With the battery pack 400 connected, section 404 of the battery pack 400 sits external to the information handling system 300.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:
a chassis;
a processor located in the chassis;
a battery pack coupled to the processor, the battery pack including a housing, the housing including a first housing section and a second housing section, wherein the first housing section comprises a battery connector, and the second housing section being larger in volume than the first housing section;
a first battery located in the first housing section, the first battery using a first cell technology and coupled to the battery connector; and
a second battery located in the second housing section, the second battery using a second cell technology that is different from the first cell technology and coupled to the battery connector, wherein the second housing section is capable of housing the second battery being of a second battery volume that is larger than a first battery volume of the first battery.

2. The information handling system of claim 1 further comprising:

a battery management unit coupled to the first battery and the second battery and operable to monitor and control the first battery and the second battery.

3. The information handling system of claim 1 further comprising:

a first battery management unit coupled to the first battery and operable to monitor and control the first battery; and a second battery management unit coupled to the second battery and operable to monitor and control the second battery.

4. The information handling system of claim 1 wherein the first cell technology is selected from the group consisting of prismatic, cylindrical, polymer, and nickel metal hydride.

5. The information handling system of claim 1 wherein the second cell technology is selected from the group consisting of prismatic, cylindrical, polymer, and nickel metal hydride.

6. The information handling system of claim 1 wherein the first cell technology is selected from the group consisting of prismatic, cylindrical, polymer, and nickel metal hydride, and the second cell technology is selected from members of the group not selected for the first cell technology.

7. The information handling system of claim 1 wherein the battery pack is situated partially within the chassis and partially external to the chassis.

* * * * *